(12) United States Patent
Roth et al.

(10) Patent No.: US 10,647,428 B2
(45) Date of Patent: May 12, 2020

(54) CARGO UNIT FOR AN AIRCRAFT AND A LOWER DECK CATERING SYSTEM

(71) Applicant: Airbus Operations GmbH, Hamburg (DE)

(72) Inventors: Ingo Roth, Hamburg (DE); Andreas Köhler, Hamburg (DE); Sassa Nadine Boos, Schenefeld (DE); Sascha-Jay Salvador, Hamburg (DE); Arne Stoldt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 590 days.

(21) Appl. No.: 14/965,411

(22) Filed: Dec. 10, 2015

(65) Prior Publication Data

US 2016/0167782 A1   Jun. 16, 2016

(30) Foreign Application Priority Data

Dec. 15, 2014 (EP) ..................................... 14197967

(51) Int. Cl.
*B64D 9/00* (2006.01)
*B64D 11/00* (2006.01)
(Continued)

(52) U.S. Cl.
CPC .................. *B64D 9/00* (2013.01); *B64C 1/22* (2013.01); *B64D 11/0007* (2013.01); *B64D 11/04* (2013.01)

(58) Field of Classification Search
CPC ...... B64D 9/00; B64D 11/04; B64D 11/0007; B64C 1/22
See application file for complete search history.

(56) References Cited

U.S. PATENT DOCUMENTS

| 3,866,861 A | * | 2/1975 | Ratcliff | .................. B64D 11/00 220/908 |
| 4,573,650 A | | 3/1986 | Clayton | |

(Continued)

FOREIGN PATENT DOCUMENTS

DE   10 2009 040 729 A1   3/2011

OTHER PUBLICATIONS

Extended European Search Report for Application No. 14 19 7967.4 dated Jun. 10, 2015.

(Continued)

*Primary Examiner* — Brian M O'Hara
(74) *Attorney, Agent, or Firm* — Jenkins, Wilson, Taylor & Hunt, P.A.

(57) ABSTRACT

A cargo unit for storage in a cargo hold of an aircraft including a housing and a storage rack arrangement, the housing enclosing the storage rack arrangement and including a transport opening. The cargo unit is connectable to a transport arrangement operable for removing objects from the storage rack arrangement and placing objects in the storage rack arrangement through the transport opening when the cargo unit is arranged in an operating position. The cargo unit includes a transport cover movable between a closed position where the transport cover closes the transport opening and an opened position where the transport opening is not covered by the transport cover. The transport cover is adapted to be only movable from its closed position to its opened position after engagement with a transport arrangement. A lower deck catering system including a cargo unit and a transport arrangement is described.

20 Claims, 3 Drawing Sheets

(51) Int. Cl.
  *B64C 1/22*  (2006.01)
  *B64D 11/04* (2006.01)

(56) References Cited

U.S. PATENT DOCUMENTS

| | | | | |
|---|---|---|---|---|
| 5,026,006 | A | * | 6/1991 | Tinder .................. B64D 25/00 244/118.5 |
| 6,454,208 | B1 | | 9/2002 | Nervig et al. |
| 9,415,873 | B2 | * | 8/2016 | McIntosh ............... B64D 11/04 |

OTHER PUBLICATIONS

European Office Action for European Application No. 14 197 967.4 dated Sep. 5, 2018.

* cited by examiner

CARGO UNIT FOR AN AIRCRAFT AND A LOWER DECK CATERING SYSTEM

CROSS-REFERENCE TO RELATED APPLICATION

This application claims priority to European Patent Application No. 14197967.4 filed Dec. 15, 2014, the entire disclosure of which is incorporated by reference herein.

TECHNICAL FIELD

The present disclosure relates to a cargo unit for storage in a cargo hold of an aircraft comprising a housing and a storage rack arrangement. The housing includes a storage rack arrangement and comprises a transport opening. The cargo unit is connectable to a transport arrangement which can be operated for selectively removing objects from the storage rack arrangement and placing objects in the storage rack arrangement through the transport opening when the cargo unit is arranged in an operating position with respect to the transport arrangement. Further, the present disclosure relates to a lower deck catering system comprising a cargo unit and a transport arrangement.

BACKGROUND

The space available for seating passengers in the passenger cabin of a commercial aircraft is limited. In times of increasing operating costs and in the intent to reduce the ecological impact of aircraft, there is a demand to increase the number of passengers that can be accommodated in an aircraft. One option to increase the amount of space available for seating passengers is the introduction of a so-called lower deck catering system. A lower deck catering system comprises a cargo unit arranged in a cargo hold, i.e. the lower deck of the aircraft, and a transport arrangement for transporting objects out of the cargo unit to a main deck of the aircraft and back from the main deck of the aircraft to the cargo unit. The cargo unit is used to store food or other goods, for example, goods for duty free shopping, for the passengers. Hence, the space which is currently occupied by the storage racks for food can be used to accommodate additional passengers.

Such a lower deck catering system does not only increase the space available in the passenger cabin of the aircraft, it may also be used to reduce the time that is required to unload waste and equip an aircraft with new objects between consecutive flights. To this end it has been suggested to disconnect a cargo unit from a transport arrangement permanently arranged in the aircraft after a flight and unload the disconnected cargo unit from the aircraft. Thereby, any remaining objects, such as unused food items and waste stored in the cargo unit can be quickly removed from the aircraft. Afterwards, another cargo unit or replenished cargo unit comprising new or fresh objects is loaded into the cargo bay of the aircraft and connected to the transport arrangement. Hence, instead of unloading and loading individual trolleys one by one, all trolleys can be loaded and unloaded from the aircraft in a single cargo unit.

The cargo units used in this approach require a transport opening in a housing of the cargo unit through which the transport arrangement can remove objects from a storage rack arrangement in the cargo unit and place objects in the storage rack arrangement. The transport opening has to be securely closed as long as the cargo unit is not connected to a transport arrangement in an aircraft. In particular, it has to be prevented that the interior of the cargo unit is contaminated or that items are illegally placed in the interior of the cargo unit, while the cargo unit is waiting on an apron to be loaded into the aircraft or while the cargo unit is transported from a catering facility to an airport.

SUMMARY

It is, therefore, an object of the present disclosure to provide a cargo unit for an aircraft and a lower deck catering system which provide a solution for the problems described in the preceding paragraphs.

In a first aspect the problem is solved by a cargo unit that comprises a transport cover movable between a closed position in which the transport cover closes the transport opening and an opened position in which the transport opening is not covered by the transport cover. The transport cover is adapted to be only movable from its closed position to its opened position after the cargo unit has come into engagement with a transport arrangement.

A cargo unit according to the present disclosure can be, for example, in the form of a unit load device (ULD). ULDs are commonly used for loading luggage and cargo into the cargo bay or lower deck of aircraft. The cargo units comprise a housing which surrounds a storage rack arrangement in which objects such as trolleys comprising, for example, food items, duty free items, beverages or meals can be stored. The housing encloses the storage rack arrangement and protects the items or objects stored in the storage rack arrangement from environmental influences.

In order to from part of a lower deck catering system, the cargo unit has to be connectable to a transport arrangement which can remove objects from the storage rack arrangement and transport them up to a passenger cabin of an aircraft and insert objects back into the storage rack arrangement which have been transported from the passenger cabin to the cargo unit. This requires a sufficiently wide transport opening in the housing of the cargo unit such that the transport arrangement can remove objects from the storage rack arrangement and insert objects back into the storage rack arrangement.

The cargo unit further comprises a transport cover for closing the transport opening. The transport cover can, for example, be a roller shutter or a roller blind. The transport cover is adapted to close the transport opening in a closed position such that the interior of the cargo unit is shielded from the environment. Thus, in the closed position the transport cover prevents the cargo unit from being contaminated and also prevents that any object can be illegally placed in the cargo unit. The transport cover can be moved to an opened position in which the transport opening is not covered by the transport cover such that a transport arrangement can access the storage rack arrangement in the cargo unit for removing and inserting objects.

To avoid that the transport cover is opened by unauthorized persons or unintentionally opened while the cargo unit is on its way to an airport or while it is waiting on an apron, the transport cover is adapted such that it cannot be moved away from the closed position unless it has come into engagement with a transport arrangement. In other words, only after the transport cover has come into contact with a transport arrangement it can be moved to the opened position such that objects in the storage rack arrangement become accessible to a transport arrangement. Thus, the cargo unit according to the present disclosure is advantageously protected from dirt which may contaminate the interior of the cargo unit or unauthorized access.

The transport cover preferably comprises at least one part. Each part of the transport cover is movable between a closed position in which a section of the transport opening to be covered by the respective part of the transport cover is covered by the respective part of the transport cover and an opened position in which the section of the transport opening to be covered by the respective part of the transport cover is not covered by the respective part of the transport cover. Each part of the transport cover is adapted to be only movable from its respective closed position to its respective opened position after the cargo unit has come into engagement with a transport arrangement.

In other words, the transport cover is preferably made up of one or more distinct parts. Each part of the transport cover is adapted to cover or close a section of the transport opening. For each part of the transport cover a closed position and an opened position are defined in analogy to the entire transport cover. When all parts of the transport cover are in their respective closed position, the entire transport cover can be considered in its closed position. Vice versa, when all parts of the transport cover are in their respective opened position, the entire transport cover can be considered in its opened position.

The parts of the transport cover are only movable from their respective closed positions towards their respective opened positions when the transport cover, i.e. at least one part of the transport cover, has come into engagement with a transport arrangement. It is not necessary that each part of the transport cover individually comes into contact with a transport arrangement. Thus, if the transport cover comprises one or more parts, it is still ensured that the transport opening remains closed or sealed until the cargo unit comes into contact with a transport arrangement. For the ease of operation it may, however, be sufficient if one of the parts of the transport cover engages with a transport arrangement and all other parts are enabled to be movable from their respective closed positions to their respective opened positions afterwards.

The cargo unit is preferably adapted to be brought into the operating position by a translational movement along a plane. The transport cover comprises a translational part. The translational part is adapted for engagement with a push element of a transport arrangement when the cargo unit is moved towards an operating position and can be moved by the push element from a closed position to an opened position after engagement with the push element when the cargo unit is moved into the operating position.

In the preferred embodiment the cargo unit can be pushed, for example, along the floor of a lower deck of a passenger aircraft towards a transport arrangement. The cargo unit moving parallel to a plane formed by the floor of the lower deck constitutes a translational movement along a plane.

The transport cover of the cargo unit comprises a translational part. The translational part can, for example, be movable along a horizontal plane between its respective opened and closed position or along a vertical plane between its respective opened and closed position. Regardless of the plane in which the translational part of the cover moves between its closed and its opened position, it can, for example, be preferred if the direction of the movement extends parallel to the plane along which the translational movement into the operating position is performed. As the translation part of the transport cover is moved by the push element to the opened position, no power source is required on the cargo unit to open the translational part of the transport cover.

It is further preferred that the translational part is adapted to remain in engagement with the push bar when the cargo unit is moved away from the operating position such that the translational part of the cover is pulled by the push element from the opened position to the closed position. The translational part is adapted to remain in engagement with the push bar until the translational part is in its closed position. Thus, the translational part of the transport cover is advantageously moved to its closed position by the same element of the transport arrangement which has pushed the transport arrangement to its opened position. The section of the transport opening to be covered by the translational part of the transport cover is, thus, automatically closed or sealed when the cargo unit is disconnected from a transport arrangement and unloaded from an aircraft.

Alternatively or additionally the transport opening comprises a vertical section extending in a vertical plane and the transport cover comprises a vertical part. The vertical part of the transport cover is adapted for covering the vertical section in a closed position. The vertical part can be moved from the closed position to an opened position by gravity upon engagement of the cargo unit with a transport arrangement.

The transport opening preferably comprises a section which extends generally in a vertical plane. To cover this section of the transport opening, a vertical part of the transport cover is provided. The vertical part of the transport cover moves in a vertical direction, i.e. in the direction or against the direction of gravity when the cargo unit is arranged in its regular orientation, between its respective closed position and opened position. As the vertical part of the transport cover moves from the closed to the opened position simply by gravity no external power source is required to move this part of the transport cover.

In a preferred embodiment the cargo unit comprises biasing structure for biasing a part of the transport cover towards the respective closed position of the part of the transport cover such that the part of the transport cover biased by the biasing structure can be moved by the biasing structure towards the closed position of the at least one part when the cargo unit is moved away from the operating position. The biasing structure which can be, for example, a rotational spring or a different mechanical energy storing structure allows to automatically move a part of the transport cover from the opened to the closed position when the cargo unit is disconnected from a transport arrangement. To this end no electrical power supply is required at the cargo unit.

If the transport cover comprises a plurality of parts, it is conceivable that only some or all of the parts of the transport cover are biased with biasing structure towards the respective closed position. Furthermore, the biasing structure does not necessarily have to be permanently functionally attached to the respective part of the transport cover. It is, for example, conceivable that a biasing structure is only functionally attached to a part of the transport cover when the cargo unit is moved away from the operational position, such that it does not bias the part of the transport cover towards the closed position before the cargo unit has been connected to a transport arrangement.

The biasing structure is preferably pre-loaded by a movement of the cargo unit with respect to a transport arrangement. A biasing structure can, for example, be preloaded or biased by a movement of a translational cover from a closed to an opened position. A biasing structure pre-loaded by the movement of a translational part of the transport cover does not necessarily have to be used to bias the translational part of the transport cover towards its closed position. It is, for example, also possible to use the biasing structure preloaded by a movement of a translational part for biasing a vertical part of the transport cover towards its closed position. Using a biasing structure which is pre-loaded by a relative movement of the cargo unit with respect to a transport arrangement can advantageously be used to ensure that the biasing structure is fully pre-loaded when the cargo unit has been arranged in the operational position.

In a preferred embodiment the cargo unit comprises a first and a second storage rack arrangement arranged on opposite sides of a base element such that when the cargo unit is in an operating position with respect to a transport arrangement, the transport arrangement can be arranged between the first and the second storage rack arrangement and above the base element and the transport arrangement can be operated to selectively remove objects from the first and the second storage rack arrangement and place objects in the first and the second storage rack arrangement. In this preferred embodiment the cargo unit comprises additional storage space for e.g. food trolleys. Only one transport arrangement is required to remove and insert items into both storage rack arrangements.

The transport opening of the cargo unit preferably comprises a horizontal section extending in a horizontal plane and a vertical section extending in a vertical plane. The transport cover comprises a translational part for covering the horizontal section. The translational part is adapted for engagement with a push element of the transport arrangement when the cargo unit is moved towards an operating position and can be moved by the push element from a closed position to an opened position after engagement with the push element when the cargo unit is moved into the operating position. The transport cover further comprises a vertical part for covering the vertical section in a closed position. The vertical part can be moved from the closed position to an opened position by gravity upon engagement of the cargo unit with a transport arrangement.

The horizontal section of the cargo unit extends, for example, in a horizontal plane formed by a ceiling or upper surface of the housing of the cargo unit and between the first and the second storage rack arrangement. The vertical section can, for example, extend in a sidewall of the housing. This shape of a transport opening makes it possible to move the cargo unit by a translational movement in a plane, for example, along the floor of a lower deck of an aircraft towards a transport arrangement which is fixedly attached to a ceiling or roof of the lower deck. The transport cover is provided in two parts, each of the parts adapted for covering one of the sections of the transport opening.

The transport cover preferably comprises a latching mechanism which is adapted for connecting the vertical part of the transport cover to the horizontal part of the transport cover in the respective closed positions of the parts of the cover such that the translational part and the vertical part cannot move towards their respective opened positions. The latching mechanism is further adapted to be released upon engagement of a push element of a transport arrangement with the translational part such that the vertical part of the transport cover can be moved into its respective opened position by gravity and the translational part of the transport cover can be moved towards the opened position by the push element. Thus, the horizontal part and the vertical part of the transport cover are secured in their respective closed positions by the same latching mechanism which holds the parts of the cover together.

Both parts are released upon engagement with a push element of a transport arrangement. The push element can, for example, be a bar or a rod attached to a transport arrangement and may comprise, for example, a release pin adapted for engagement with a recess provided at the cargo unit which opens or releases the latching mechanism such that both the vertical part and the horizontal part of the transport cover can be moved to the opened position. Hence, only a single actuation device is required at a transport arrangement to release both the vertical part and the translational part of the transport cover.

In a preferred embodiment the cargo unit comprises a biasing structure for biasing the vertical part of the transport cover towards its closed position. The biasing structure is adapted to be preloaded by a movement of the translational part of the transport cover from the respective closed position to the respective opened position. Thus, the vertical part of the transport cover which moves from its closed to its opened position due to the gravitational forces acting on to the vertical part of the transport cover is provided with a biasing structure for moving the vertical part of the transport cover back into its closed position when the cargo unit is disconnected from a transport arrangement. The force required to move the vertical part back up against gravity is advantageously generated and stored when the translational part of the transport cover is pushed by a push element into its opened position.

In a second aspect the problem is solved by a lower deck catering system comprising a cargo unit according to any of the preceding preferred embodiments and a transport arrangement which can be operated for selectively removing objects from the storage rack arrangement of the cargo unit and placing objects in the storage rack arrangement of the cargo unit through the transport opening when the cargo unit is arranged in an operating position with respect to the transport arrangement. The system according to the present disclosure shares the advantages of the respective cargo units described in the preceding paragraphs that form part of the system. Further, any aspects described with respect to a cargo unit or a transport arrangement in the preceding paragraphs also apply to a cargo unit and a transport arrangement used in a system according to the present disclosure.

BRIEF DESCRIPTION OF THE DRAWINGS

In the following an exemplary embodiment of a cargo unit according to the present disclosure and an exemplary embodiment of a lower deck catering system according to the present disclosure will be described with reference to the drawings, wherein.

DETAILED DESCRIPTION

Figure 1:
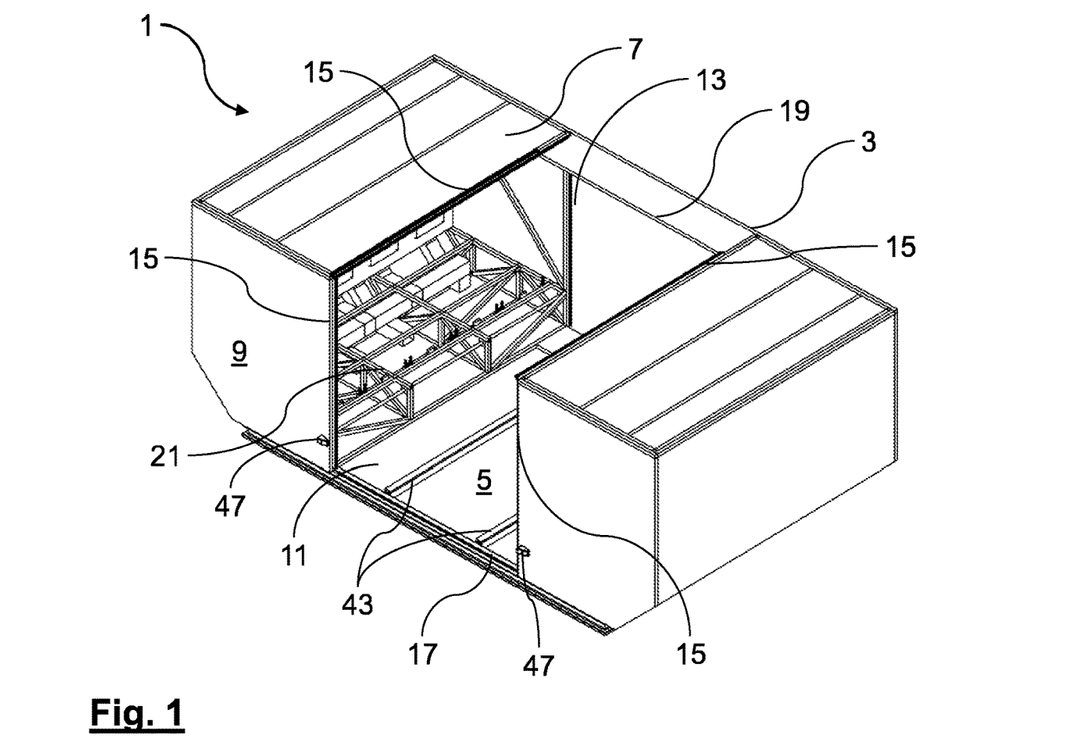
FIG. 1 shows a perspective view of an exemplary embodiment of a cargo unit according to the present disclosure with a transport cover in an opened position.
Figure 2:
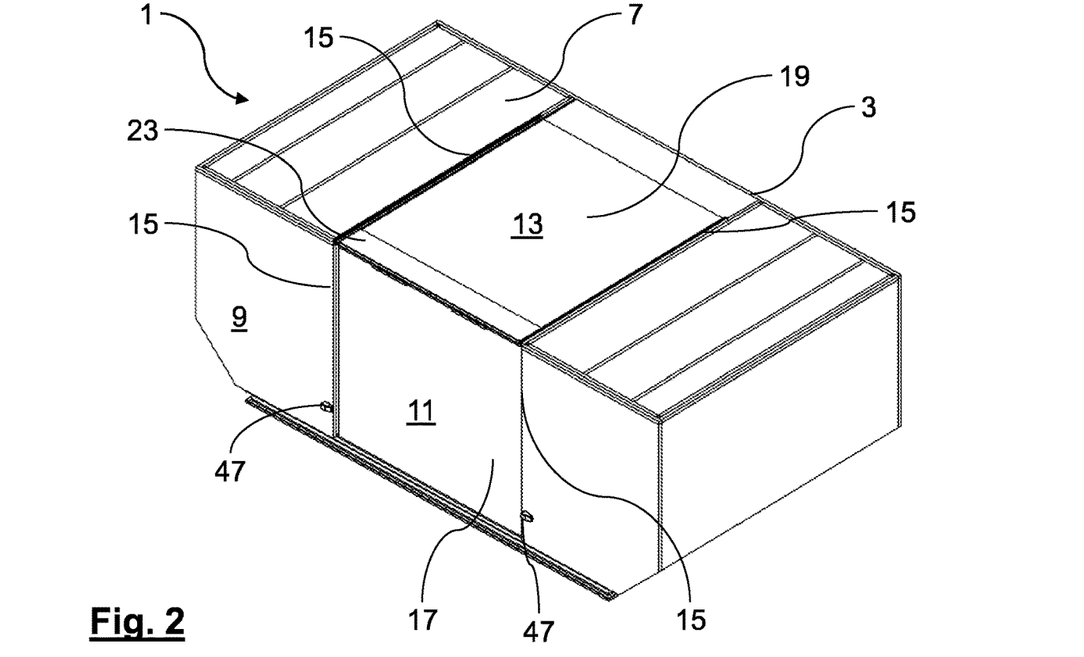
FIG. 2 shows a perspective view of the cargo unit of FIG. 1 with the transport cover in a closed position and FIGS. 3-6 show perspective views of an exemplary embodiment of a lower deck catering system according to the present disclosure comprising the cargo unit of FIGS. 1 and 2 and a transport arrangement arranged in various positions with respect to one another.

FIGS. 1 and 2 show an exemplary embodiment of a cargo unit 1 according to the present disclosure. The cargo unit 1 has the outer shape of a unit load device, for example, an LD6. The cargo unit 1 comprises a housing 3 protecting the inside of the cargo unit 1 from contamination by dirt or preventing unauthorized access to the interior of the cargo unit 1. The housing 3 comprises amongst other surfaces a base element 5, a top element or ceiling 7 and a sidewall 9 and can be made, for example, from aluminum. The base element 5 and the top element 7 both extend in a horizontal plane. The sidewall 9 extends generally in a vertical plane, i.e. perpendicular to the horizontal planes in which the base element 5 and the top element 7 extend. Whenever the terms horizontal and vertical are used with reference to a cargo unit or another object, it is understood that the respective cargo unit or other objected has an evident regular orientation in which vertical and horizontal directions are clearly and unambiguously defined.

The housing 3 comprises a transport opening 11, 13 having a vertical section 11 and a horizontal section 13. The vertical section 11 extends in the sidewall 9 and, therefore, generally in a vertical plane. Likewise, the horizontal section 13 extends in the top element 7 of the housing 3 and, therefore, generally in a horizontal plane. The sections 11, 13 of the transport opening 11, 13 are delimited by rails 15 and two parts 17, 19 of a transport cover 17, 19 which are in their respective opened position. The rails 15 are provided to guide the parts 17, 19 of the transport cover 17, 19 when moving between the respective opened and closed positions and hold the extended transport cover 17, 19 in place when the transport cover 17, 19 is in the closed position as can be seen in FIG. 2.

The size of the transport opening 11, 13 and the arrangement of the sections 11, 13 of the transport opening 11, 13 has been chosen such that the cargo unit 1 can be connected to a transport arrangement as described in more detail with reference to FIGS. 3 to 6. The transport arrangement is provided for removing objects from a first and a second storage rack arrangement 21 arranged inside the cargo unit 1. In FIG. 1 only the first storage rack arrangement 21 is visible. The storage rack arrangements 21 are arranged on opposite sides of the base element 5 such that a transport arrangement can be arranged in between the first and the second storage rack arrangement 21 and such that the transport arrangement can place or remove items or objects from either of the storage rack arrangements 21. The storage rack arrangements 21 can, for example, be used to store trolleys comprising meals, beverages or other items for passengers of an aircraft.

In FIG. 2 the transport cover 17, 19 is shown in its closed position in which sections 11, 13 of the transport opening 11, 13 are completely closed or covered by the transport cover 17, 19 such that that the interior of the cargo unit 1 is protected from contamination or unauthorized access. The part 17 of the transport cover 17, 19 which is provided for covering the vertical section 11 of the transport opening 11, 13 is also referred to as a vertical part 17 moving between its opened and its closed position in a generally vertical direction. The vertical part 17 of the transport cover 17, 19 is movable from the closed to the opened position merely by gravity. The other part 19 of the transport cover 17, 19 is also referred to as a translational part 19 generally movable in a horizontal plane between an opened position as shown in FIG. 1 and a closed position as shown in FIG. 2.

The parts of the transport cover 17, 19 are provided as roller blinds or roller shutters which are rolled up in their respective opened position and extended in their respective closed position. A roller blind can, for example, be formed by a canvas guided in lateral rails 15.

A latching mechanism 23 is provided for connecting the vertical part 17 and the translational part 19 of the transport cover 17, 19 to one another in their respective closed positions. The latching mechanism the 23 comprises a spring-loaded mechanism which is integrated into the translational part 19 and prevents an unintended opening of the transport cover 17, 19 before the transport cover 17, 19 engages with a transport arrangement. An operation of the latching mechanism 23 releasing the transport cover 17, 19 such that the parts of the transport cover 17, 19 can be moved in their respective opened position will be described in the following with reference to FIGS. 3 to 6.

In FIGS. 3 to 6 an exemplary embodiment of a lower deck catering system 25 according to the present disclosure comprising the cargo unit 1 already described with reference to FIGS. 1 and 2 and a transport arrangement 27 is shown in more detail. The transport arrangement 27 is permanently arranged in the lower deck of a passenger aircraft. A top element 29 of the transport arrangement 27 can be formed, for example, by the floor of the main deck or passenger deck of an aircraft. A cut-out or recess 31 provided in the top element 29 of the transport arrangement 27 is adapted for a lift not shown in the FIGS. which can transport objects between the lower deck and the main deck of the aircraft. The transport arrangement 27 further comprises a conveyor unit 33 for removing from the storage rack assemblies 21 and inserting objects into the storage rack assemblies in 21 of a cargo unit 1 and moving the objects between the storage rack assemblies 21 and a lift assembly.

FIGS. 3 to 6 show how the cargo unit 1 is moved to an operating position in which it is connected to the transport arrangement 27 such that objects such as trolleys can be removed from the storage rack arrangements 21 of the cargo unit 1 by the transport arrangement 27 and also placed in the storage rack arrangements 21 by the transport arrangement 27. The cargo unit 1 can be moved in and out of a lower deck of a passenger aircraft. Once it has been moved into the lower deck or cargo bay of the aircraft, for example, by a sideways movement in a direction extending parallel both to the plane formed by the top element 7 and the sidewall 9 of the cargo unit 1, the cargo unit 1 can be moved on the floor of the lower deck in a longitudinal direction of the aircraft towards the transport arrangement 27.

Figure 3:
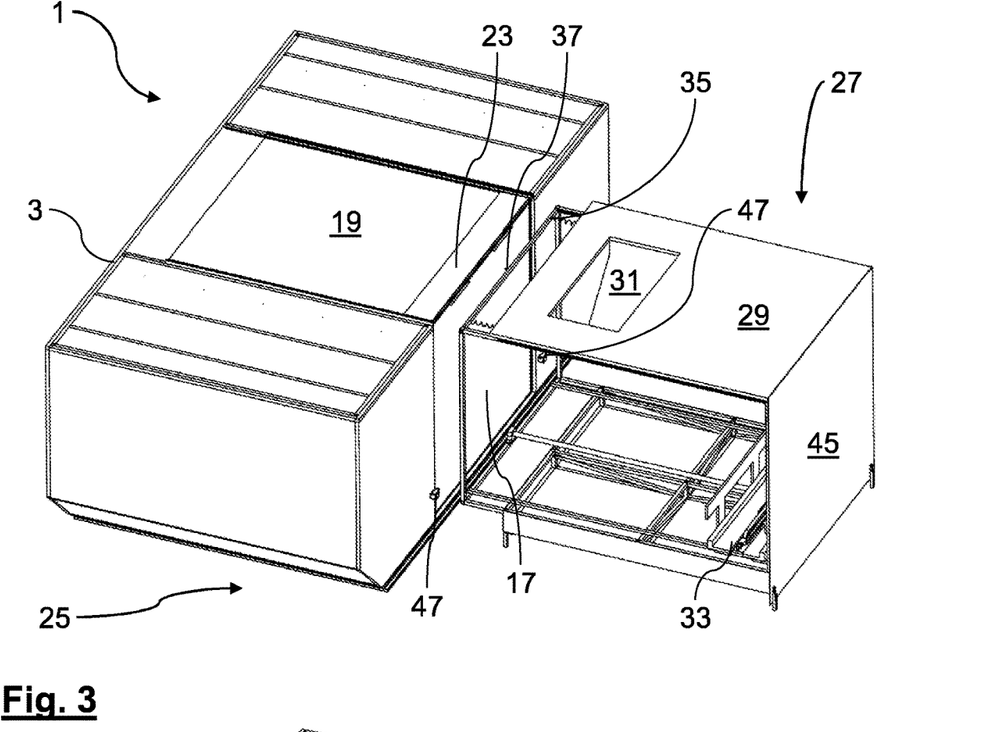

In FIG. 3 the cargo unit 1 and the transport arrangement 27 are shown right before engagement of the cargo unit 1 with a push element or a push bar 35 of the transport arrangement 27. The transport cover 17, 19 is in its closed position. The push bar 35 is biased by biasing elements in the form of springs towards the cargo unit 1 and can be pushed completely under the top element 29 of the transport arrangement 27 when the cargo unit 1 is in the operating position with respect to the transport arrangement 27 as shown in FIG. 6.

Figure 4:
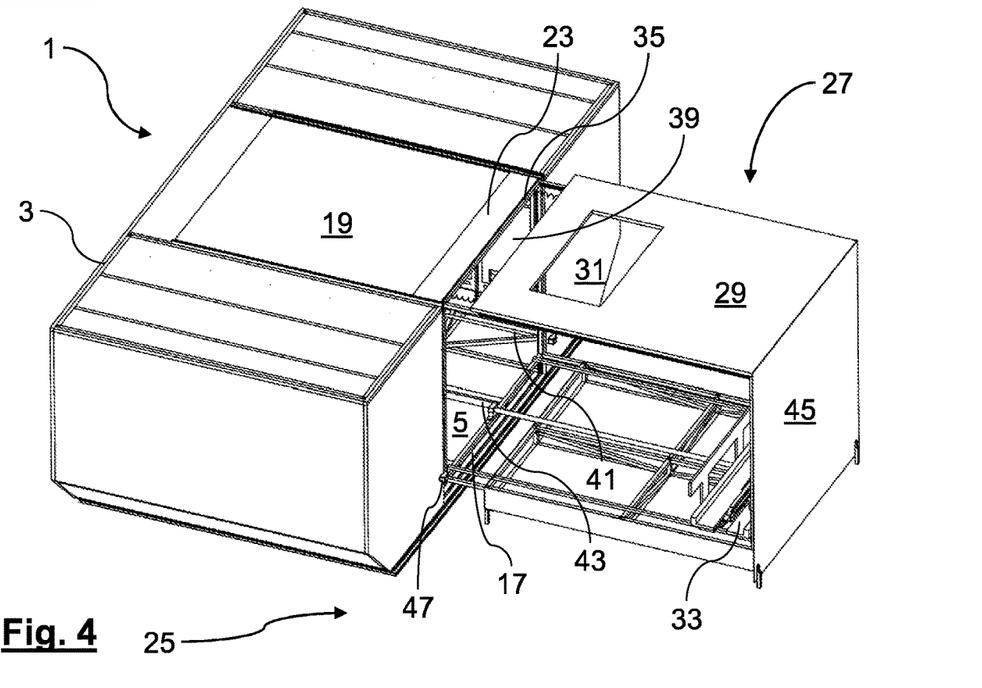

In FIG. 4 the cargo unit 1 has been moved in a translational movement along a floor of a lower deck of an aircraft towards the transport arrangement 27 and the push bar 35 has come into engagement with the cargo unit 1 and, to be more precise, the latching mechanism 23 connecting the vertical and translational parts 17, 19 of the transport cover 17, 19. In FIG. 3 it can be seen that the push bar 35 comprises a release pin 37 for engagement with a recess (not shown) provided at the latching mechanism 23. Upon engagement of the release pin 37 with the recess, the spring-loaded locking mechanism of the latching mechanism 23 is released such that the vertical and translational parts 17, 19 of the transport cover 17, 19 can be moved from their respective closed to their respective opened positions. As the vertical part 17 of the transport cover is moved just by gravity from its closed to its opened position, the vertical section 11 of the transport opening 11, 13 is immediately uncovered after the vertical part 17 has been released from the latching mechanism 23. In FIG. 4 objects 39 in the form of trolleys 39 storing food items are shown arranged in a second storage rack arrangement 41.

Figure 5:
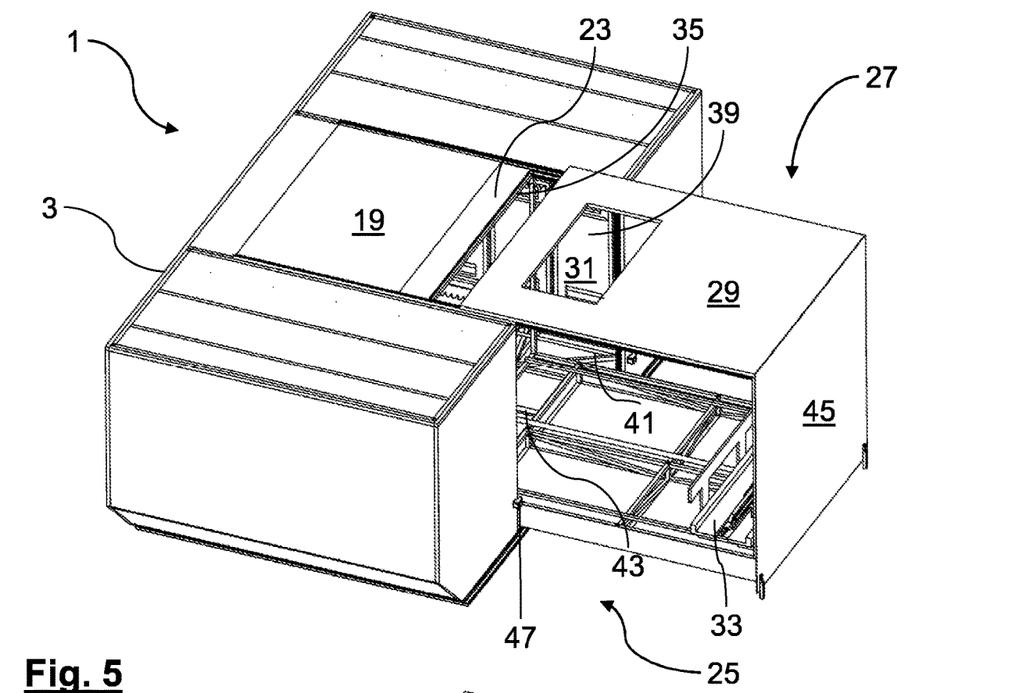

Next, the cargo unit 1 is pushed towards its operating position in a translational movement. To ensure that the cargo unit 1 is correctly aligned with respect to the transport arrangement 27 guiding elements 43 are provided on the base element 5 of the cargo unit 1. The guiding elements 43 which are best visible in FIG. 1 provide a self-aligning guiding mechanism of the lower deck catering system 25. While the cargo unit 1 is pushed towards its operating position, the push element 35 remains in engagement with the latching mechanism 23 and pushes the translational part 19 of the transport cover 17, 19 towards its opened position. The push element 35 also remains in engagement with the latching mechanism 23 when the cargo unit 1 is moved away from its operating position with respect to the transport arrangement 27 such that the push element 35 essentially pulls the translational part 19 of the transport cover 17, 19 from its opened to its closed position. While the translational part 19 of the transport cover 17, 19 is moved to its opened position it pre-loads a biasing structure in form of a spring coil which is not shown in the Figures. The preloaded biasing structure is adapted for moving the vertical part 17 of the transport cover 17, 19 back to its closed position when the cargo unit 1 is disconnected from the transport arrangement 27. Thus, the cargo unit 1 advantageously does not require any electrical or hydraulic power sources for opening and closing the transport cover 17, 19.

Figure 6:
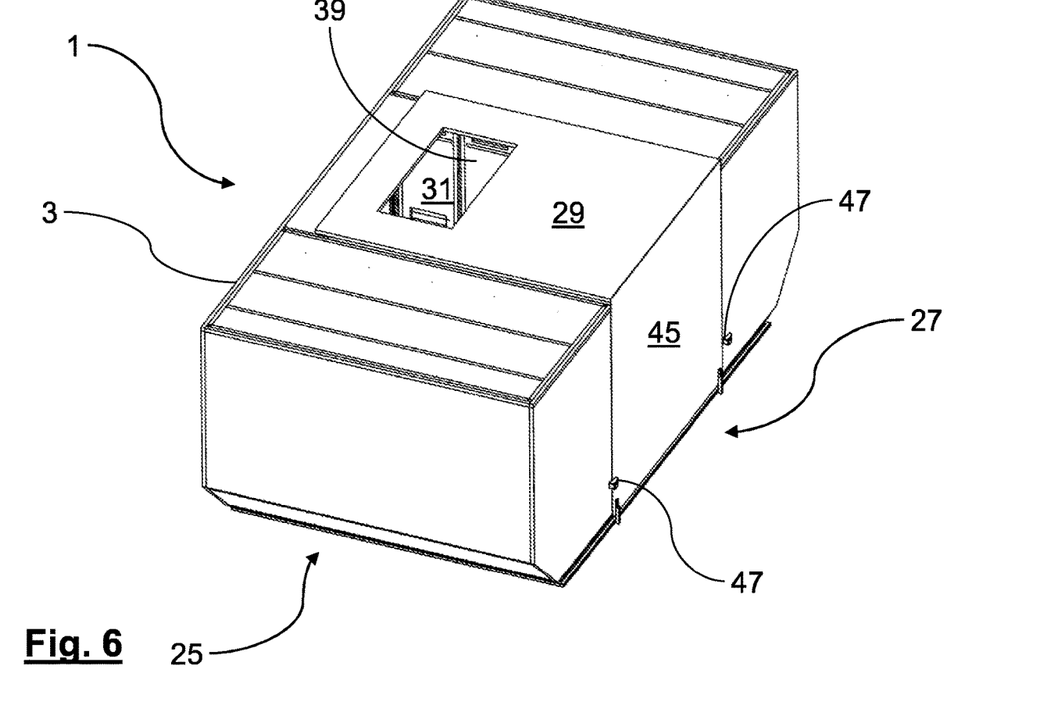

Finally, in FIG. 6 the cargo unit 1 has been moved into its operating position with respect to the transport arrangement 27. The transport opening 11, 13 of the cargo unit 1 is now completely closed by the top element 29 and a sidewall 45 and the transport arrangement 27 may selectively remove objects 39 from the storage rack arrangements 21, 41 and selectively place objects 39 in the storage rack arrangements 21, 41.

The cargo unit 1 further comprises two spring-loaded conveyor locks 47. The conveyor locks 47 comprise tapered surfaces facing towards the transport opening 7, 13 and are pushed sideways away from the transport opening by a transport arrangement 27 when the cargo unit 1 is moved towards an operating position. When the cargo unit 1 has reached its operating position with respect to the transport arrangement 27, the spring-loaded conveyor locks 47 move back into the original positions and look the cargo unit 1 to the transport arrangement 27. Thereby it is automatically ensured that the cargo unit 1 cannot unintentionally detach from the transport arrangement 27.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cargo unit for storage in a cargo hold of an aircraft, the cargo unit comprising:
 a first storage rack arrangement;
 a housing that encloses the first storage rack arrangement and comprises a transport opening; and
 a transport cover movable between a closed position, in which the transport cover closes the transport opening, and an opened position, in which the transport opening is not covered by the transport cover,
 wherein the cargo unit is movable, relative to a transport arrangement that is in the cargo hold of the aircraft, into an operating position, the transport arrangement being operable for selectively removing objects from the first storage rack arrangement and placing objects in the first storage rack arrangement through the transport opening when the cargo unit is moved, relative to the transport arrangement, into the operating position, and
 wherein the transport cover is adapted to be only movable from its closed position to its opened position after the cargo unit has come into engagement with the transport arrangement, and
 wherein the transport arrangement is configured so that objects can be transported from the cargo hold, in a lower deck of the aircraft, to a main deck of the aircraft.

2. The cargo unit according to claim 1, wherein the transport cover comprises at least one part, wherein each part of the transport cover is movable between a closed position, in which a section of the transport opening is covered by a respective part of the transport cover, and an opened position, in which the section of the transport opening is not covered by the respective part of the transport cover, and wherein each part of the transport cover is adapted to be only movable from its respective closed position to its respective opened position after the transport cover has come into engagement with the transport arrangement.

3. The cargo unit according to claim 2, wherein each part of the transport cover is formed as a roller shutter or a roller blind.

4. The cargo unit according to claim 2, wherein the transport opening comprises a vertical section extending in a vertical plane and the transport cover comprises a vertical part, and
 wherein the vertical part of the transport cover is adapted for covering the vertical section in the closed position and is movable from the closed position to an opened position by gravity upon engagement of the cargo unit with the transport arrangement.

5. The cargo unit according to claim 2, wherein the cargo unit comprises a biasing structure for biasing the part of the transport cover towards the respective closed position of the part of the transport cover, such that the part of the transport cover biased by the biasing structure is movable by the biasing structure towards the closed position of the at least one part when the cargo unit is moved away from the operating position.

6. The cargo unit according to claim 5, wherein the biasing structure is adapted to be preloaded by a movement of the cargo unit with respect to the transport arrangement.

7. The cargo unit according to claim 1, wherein the cargo unit comprises a second storage rack arrangement arranged on opposite sides of a base element such that, when the cargo unit is moved into the operating position with respect to the transport arrangement, the transport arrangement is arranged between the first storage rack arrangement and the second storage rack arrangement and above the base element and the transport arrangement is also operable to selectively remove objects from the second storage rack arrangement and place objects in the second storage rack arrangement.

8. The cargo unit according to claim 7, wherein the transport opening comprises a horizontal section extending in a horizontal plane and a vertical section extending in a vertical plane,
wherein the transport cover comprises a translational part for covering the horizontal section, wherein the translational part is adapted for engagement with a push element of the transport arrangement when the cargo unit is moved towards the operating position and is movable by the push element from a closed position to an opened position after engagement with the push element when the cargo unit is moved into the operating position, and
wherein the transport cover comprises a vertical part for covering the vertical section in a closed position thereof, the vertical part being movable from the closed position to the opened position, using gravity, upon engagement of the cargo unit with the transport arrangement.

9. The cargo unit according to claim 8, wherein the transport cover comprises a latching mechanism adapted for connecting the vertical part of the transport cover to a horizontal part of the transport cover in respective closed positions of the parts of the transport cover such that the translational part and the vertical part are not movable towards their respective opened positions, and
wherein the latching mechanism is adapted to be released upon engagement of the push element of the transport arrangement with the translational part, such that the vertical part of the transport cover is movable into its respective opened position by gravity and the translational part of the transport cover is movable towards its opened position by the push element.

10. The cargo unit according to claim 9, wherein the cargo unit comprises a biasing structure for biasing the vertical part of the transport cover in the closed position thereof, and wherein the biasing structure is adapted to be preloaded by a movement of the translational part of the transport cover from the closed position thereof to the opened position thereof.

11. A catering system comprising:
a cargo unit for storage in a cargo hold of an aircraft, the cargo unit comprising:
a storage rack arrangement;
a housing that encloses the storage rack arrangement and comprises a transport opening; and
a transport cover movable between a closed position, in which the transport cover closes the transport opening, and an opened position, in which the transport opening is not covered by the transport cover; and
a transport arrangement in the cargo hold of the aircraft, wherein the cargo unit is movable, relative to the transport arrangement, into an operating position,
wherein the transport arrangement is operable for selectively removing objects from the first storage rack arrangement and placing objects in the first storage rack arrangement through the transport opening when the cargo unit is moved, relative to the transport arrangement, into the operating position,
wherein the transport cover is adapted to be only movable from its closed position to its opened position after the cargo unit has come into engagement with the transport arrangement, and
wherein the transport arrangement is configured so that objects can be transported from the cargo hold, in a lower deck of the aircraft, to a main deck of the aircraft.

12. A cargo unit for storage in a cargo hold of an aircraft, the cargo unit comprising:
a first storage rack arrangement;
a housing that encloses the first storage rack arrangement and comprises a transport opening; and
a transport cover movable between a closed position, in which the transport cover closes the transport opening, and an opened position, in which the transport opening is not covered by the transport cover,
wherein the cargo unit is connectable to a transport arrangement operable for selectively removing objects from the first storage rack arrangement and placing objects in the first storage rack arrangement through the transport opening when the cargo unit is arranged in an operating position with respect to the transport arrangement,
wherein the transport cover is adapted to be only movable from its closed position to its opened position after the cargo unit has come into engagement with the transport arrangement,
wherein the transport cover comprises at least one part, wherein each part of the transport cover is movable between a closed position, in which a section of the transport opening is covered by a respective part of the transport cover, and an opened position, in which the section of the transport opening is not covered by the respective part of the transport cover,
wherein each part of the transport cover is adapted to be only movable from its respective closed position to its respective opened position after the transport cover has come into engagement with the transport arrangement,
wherein the cargo unit is adapted to be brought into the operating position by a translational movement along a plane, and
wherein the transport cover comprises a translational part adapted for engagement with a push element of the transport arrangement when the cargo unit is moved towards the operating position and is movable by the push element from a closed position to an opened position after engagement with the push element when the cargo unit is moved into the operating position.

13. The cargo unit according to claim 12, wherein the translational part is adapted to remain in engagement with the push element when the cargo unit is moved away from the operating position such that the translational part of the transport cover is pulled by the push element from the opened position to the closed position, wherein the translational part is adapted to remain in engagement with the push element until the translational part is in its closed position.

14. The cargo unit according to claim 12, wherein the transport cover comprises at least one part, wherein each part of the transport cover is movable between a closed position, in which a section of the transport opening is covered by a respective part of the transport cover, and an opened position, in which the section of the transport opening is not covered by the respective part of the transport cover, and wherein each part of the transport cover is adapted to be only movable from its respective closed position to its respective opened position after the transport cover has come into engagement with the transport arrangement.

15. The cargo unit according to claim 14, wherein the transport opening comprises a vertical section extending in a vertical plane and the transport cover comprises a vertical part, and wherein the vertical part of the transport cover is adapted for covering the vertical section in the closed position and is movable from the closed position to an opened position by gravity upon engagement of the cargo unit with the transport arrangement.

16. The cargo unit according to claim 14, wherein the cargo unit comprises a biasing structure for biasing the part of the transport cover towards the respective closed position of the part of the transport cover, such that the part of the transport cover biased by the biasing structure is movable by the biasing structure towards the closed position of the at least one part when the cargo unit is moved away from the operating position.

17. The cargo unit according to claim 16, wherein the biasing structure is adapted to be preloaded by a movement of the cargo unit with respect to the transport arrangement.

18. The cargo unit according to claim 12, wherein the cargo unit comprises a second storage rack arrangement arranged on opposite sides of a base element such that, when the cargo unit is moved into the operating position with respect to the transport arrangement, the transport arrangement is arranged between the first storage rack arrangement and the second storage rack arrangement and above the base element and the transport arrangement is also operable to selectively remove objects from the second storage rack arrangement and place objects in the second storage rack arrangement.

19. The cargo unit according to claim 12, wherein the transport opening comprises a horizontal section extending in a horizontal plane and a vertical section extending in a vertical plane, wherein the transport cover comprises a translational part for covering the horizontal section, wherein the translational part is adapted for engagement with a push element of the transport arrangement when the cargo unit is moved towards the operating position and is movable by the push element from a closed position to an opened position after engagement with the push element when the cargo unit is moved into the operating position, and wherein the transport cover comprises a vertical part for covering the vertical section in a closed position thereof, the vertical part being movable from the closed position to the opened position, using gravity, upon engagement of the cargo unit with the transport arrangement.

20. The cargo unit according to claim 19, wherein the transport cover comprises a latching mechanism adapted for connecting the vertical part of the transport cover to a horizontal part of the transport cover in respective closed positions of the parts of the transport cover such that the translational part and the vertical part are not movable towards their respective opened positions, and wherein the latching mechanism is adapted to be released upon engagement of the push element of the transport arrangement with the translational part, such that the vertical part of the transport cover is movable into its respective opened position by gravity and the translational part of the transport cover is movable towards its opened position by the push element.

\* \* \* \* \*